March 3, 1970    E. D. VICKERY    3,498,566
PARACHUTE
Filed April 16, 1968    2 Sheets-Sheet 1
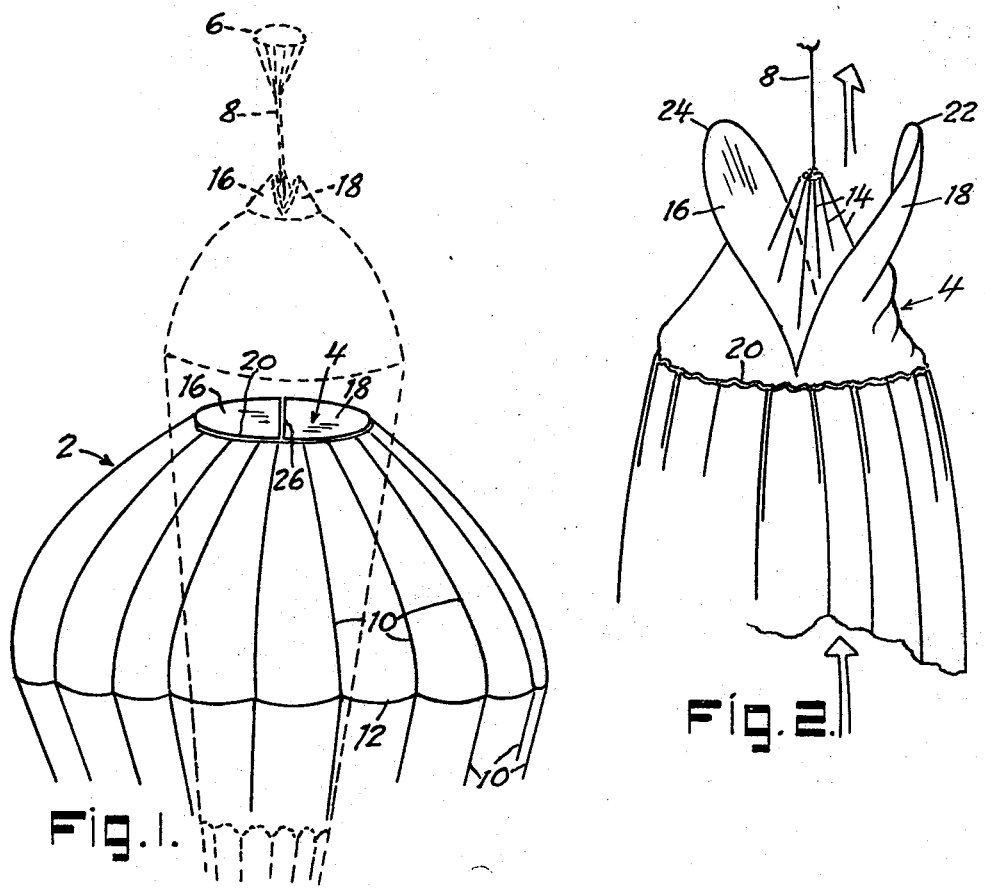
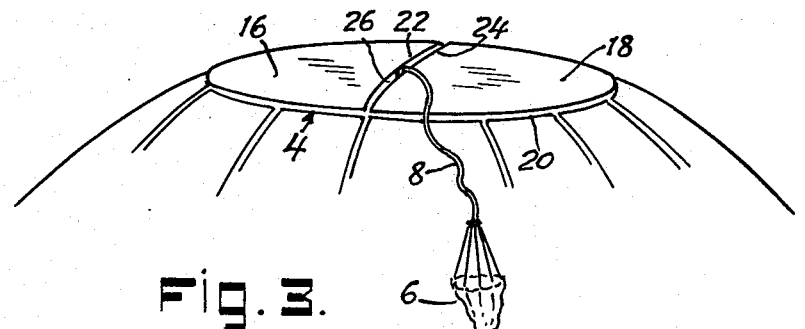
INVENTOR
EDWIN D. VICKERY
BY
Sperry and Zoda
ATTORNEYS March 3, 1970  E. D. VICKERY  3,498,566
PARACHUTE Filed April 16, 1968  2 Sheets-Sheet 2

INVENTOR
EDWIN D. VICKERY
BY
Perry and Joda
ATTORNEYS

United States Patent Office 3,498,566
Patented Mar. 3, 1970

3,498,566
PARACHUTE
Edwin D. Vickery, Tolland, Conn., assignor to Pioneer Parachute Company, Inc., a corporation of Delaware
Filed Apr. 16, 1968, Ser. No. 721,741
Int. Cl. B64d 17/18
U.S. Cl. 244—152                               6 Claims

ABSTRACT OF THE DISCLOSURE

A parachute canopy having a vent in the peak thereof and provided with air flow controlling means for the vent which extend from at least one side of the vent opening toward an opposite side thereof. The cover means thus provided serve to permit relatively free flow of air through the vent in the peak of the canopy during the initial stages of deployment of the parachute and thereafter they advantageously may restrict or direct the air flow, the latter serving as directional means to aid in guiding the parachute during its descent.

BACKGROUND OF INVENTION

It has been usual practice heretofore to provide parachute canopies with a vent opening in the peak of the canopy through which air flows from the lower to the upper surface of the canopy so that the parachute will not have to oscillate to dump air out from beanth the canopy. As a result the parachute tends to descend more nearly vertically. The size of the vents employed for this purpose may vary but they generally have been in the neighborhood of about 5 to 10% of the total diameter of the parachute canopy. If larger diameter vents are employed, the shock loading of the canopy is reduced as the canopy initially opens but the parachute thereafter will have a relatively high rate of descent and it is not generally possible to attain as great a gliding effect as when smaller vent openings are provided.

It has been suggested that the advantages of reduced shock loading due to the use of a relatively large vent opening might be attained by providing some cover means or restriction for the vent in the peak of the canopy. Thus a vent cover is disclosed in the German patent to Heinecke No. 583,027 and elastic restricting means have been disclosed in U.S. patent to Smith, No. 2,350,646. However, few if any constructions of this type have been used extensively and in any event they are not adapted for application to guided parachutes having directional or gliding characteristics.

SUMMARY OF INVENTION

In accordance with the present invention, a novel type of parachute construction is provided wherein the canopy has a vent opening in the peak thereof through which air may flow and is provided with air flow controlling means which extend inward from one or more sides of the vent opening toward the center or opposite side thereof. Since the vent opening is not extended to its maximum diameter or full opening during the initial stages of deployment of the parachute, the vent cover means initially is relatively freely movable to permit the flow of air through the vent opening without material restriction. Thereafter as the parachute canopy is fully deployed the vent opening is extended to its maximum diameter or shape whereupon the vent closing means are drawn downward or inward into air flow restricting or directing positions. As a result, the descent of the parachute after full deployment thereof may be controlled despite the fact that the vent opening may actually be relatively large in diameter, if desired. Furthermore, by suitably forming and arranging the air flow controlling means, it is possible to utilize such means as directional or guiding means to enable the parachute canopy to be suitably controlled during its descent, whereby the parachute and its load may be caused to land at a predetermined point or location.

THE DRAWINGS

FIGURE 1 is a diagrammatic illustration showing the manner in which a parachute will open;

FIGURE 2 is a perspective illustrating the peak portion of a typical parachute canopy embodying the present invention with the air flow control extending into air discharging positions;

FIGURE 3 is a perspective illustrating the parachute construction shown in FIGURE 2 with the canopy fully deployed;

PREFERRED EMBODIMENTS OF THE INVENTION

Figure 4:
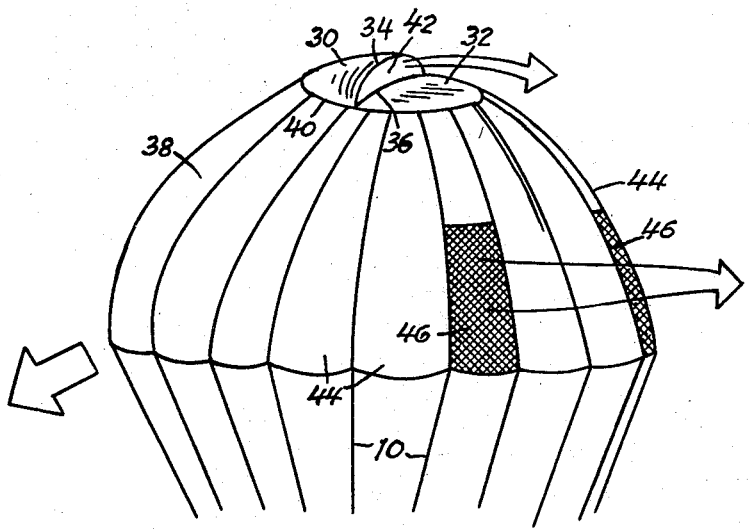
FIGURE 4 illustrates an alternative embodiment of the present invention.

In FIGURE 1 of the drawing a fully opened parachute is illustrated in full lines whereas the shape assumed by the parachute canopy when it is first drawn from its pack or enclosure, and during initial stages of deployment, is illustrated in dotted lines. As thus shown the parachute canopy 2 is provided with a vent opening 4 in the peak thereof and has a pilot chute 6 connected to the canopy by means of a bridle or other suitable connection 8 for drawing the parachute out of the pack, sleeve, or enclosure in which it is stowed prior to use.

The parachute canopy may be of any chosen size, shape, and configuration and as shown in FIGURES 1, 2, and 3, the vent opening 4 in the peak of the canopy of the parachute is preferably circular in form. As shown in FIGURE 2 the suspension lines 10 may, if desired, extend upward from the skirt 12 of the parachute so as to extend over the canopy and across the vent opening 4 and then continue on downward below the skirt 12 of the canopy to one or more load points (not shown). In the alternative the suspension lines 10 may terminate near the skirt 12 and separate vent lines may be attached to the canopy along the main seams and about the vent opening 4. In any event the pilot chute 6 may be of any preferred type and many have the bridle or connection 8 thereof attached to those portions 14 of the suspension lines or vent lines which extend across the vent opening 4.

Air flow control means for the vent opening 4 are provided for at least partially restricting or controlling the flow of air through the vent opening 4 during normal descent of the parachute. The air flow control means illustrated in FIGURES 1, 2 and 3 consists of two cover members 16 and 18 attached to the canopy 2 adjacent the opposite sides of the vent opening 4 and along a band or hem of material at the marginal edge of the opening as indicated at 20. The cover members 16 and 18 are generally semi-circular in shape and have the outer marginal edges thereof sewn or otherwise attached to the marginal binding or hem 20 of the vent opening whereas the inner free edges 22 and 24 of the cover members 16 and 18 are preferably located in adjacent or overlapping relation and are in the form of straight lines which, during normal descent of the parachute, are located in substantially parallel relation so as to extend generally diametrically across the vent opening 4. When thus formed and arranged an air discharge slot or opening 26 is presented between the free edges 22 and 24 of the inwardly extending cover members 16 and 18 to limit or control the outflow of air from beneath the canopy.

However, prior to deployment of the parachute, the canopy is folded within a pack cover, sleeve or the like and as a result, the vent opening 4 and the band 20 surrounding the vent opening are in a collapsed or folded arrangement. The closure means 16 and 18 are also folded in suitable form so as to occupy a minimum space. Accordingly, when the pilot chute 6 is released and the parachute canopy is drawn out of the pack or cover in which it is enclosed, the canopy will first assume an elongated form wherein the vent opening 4 and hem 20 remain in relatively contracted or collapsed condition as indicated in dotted lines in FIGURE 1. The edges 22 and 24 of the cover members 16 and 18 may initially be releasably secured together by means of break threads, velcro tape or the like, if desired. As a result, the air initially entering the canopy adjacent the skirt 12 will flow toward the peak of the canopy and only a limited amount of such air will be permitted to flow through the contracted vent opening 4. At this time the closure members 16 and 18 for the vent opening will start to separate so as to assume positions somewhat as shown in FIGURES 1 and 2 which will allow some air to escape through the vent opening. Nevertheless, the closure members 16 and 18 still impose a sufficient restriction to the flow of air through the vent opening during the initial stages of deployment to assure proper inflation of the canopy. Therefore the major portion of the air flowing past the skirt 12 of the canopy and into the peak thereof expands radially outward, so as to extend the portion of the canopy adjacent the peak. As a result the band or hem 20 of the material adjacent the edge of the vent opening 4 is expanded and the closure elements 16 and 18 are drawn downward from the positions as shown in FIGURE 2 to the positions illustrated in FIGURE 3. In this way, the inner free edges 22 and 24 of the closure members 16 and 18 are drawn down into positions wherein they are substantially parallel and present an opening 26 of such size as to control or restrict the flow of air through the now expanded vent opening 4. It will therefore be apparent that the size or diameter of the vent opening 4 may, if desired, be substantially greater than that normally permissible in prior parachute canopy constructions.

As shown in FIGURE 4 of the drawings, the air flow restricting members 30 and 32 may be utilized to aid in guiding and control of the parachute during descent. For this purpose, the free edge 34 of the member 30 may be formed so as to be of greater length than the free edge 36 of the member 32. Accordingly, when the parachute canopy 38 is fully deployed and the sides or hem 40 of the vent opening 4 is drawn out of its maximum diameter, the member 32 will be stretched taut and will be drawn down into a plane substantially coinciding with the marginal hem 40 of the vent opening. On the other hand the free edge 34 of the member 30 will extend upward so that free edge 34 will be spaced from the edge 36 to present an air discharge opening 42 which faces rearwardly of the parachute canopy 38. Moreover, as shown in FIGURE 4, the canopy 38 may be made up of fabric gores 44, but have one or more blank gores or more porous portions 46 through which air may issue rearwardly from beneath the canopy to impart a forward thrust to the parachute during descent. In this way, the rearward thrust of the air issuing through the discharge opening 42 in the peak of the parachute canopy may be combined with other air flow control means or vents 46 to aid guiding the parachute during descent.

Figure 5:
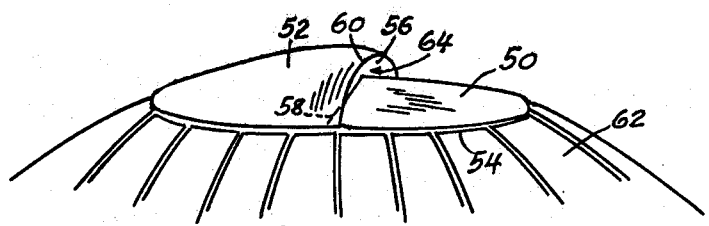
FIGURES 5 and 6 are perspective views illustrating further alternative constructions embodying the present invention.

In the further alternative construction illustrated in FIGURE 5 of the drawings, the air flow controlling means is in the form of two members 50 and 52 which extend inwardly toward each other from the sides or marginal edges 54 of the vent opening 56. In this instance, the adjacent free edges 58 and 60 of the members 50 and 52 respectively are arranged so as to be located in overlapping relation as shown. In this way, upon deployment of the parachute canopy 62, a further and more controlled directional thrust is imparted to the air flowing from the interior to the exterior of the parachute canopy through the resulting air flow opening 64.

Figure 6:
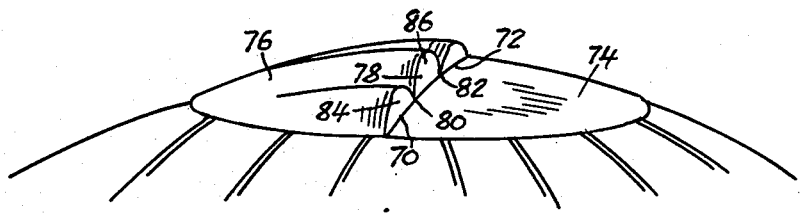

In the additional alternative form of the invention illustrated in FIGURE 6, the adjacent edges 70 and 72 of the two members 74 and 76 of the air restricting means for the vent opening 78 are attached together at spaced points 80, 82, etc. to present a plurality of air discharge openings 84, 86, etc. which may be spaced apart or varied in width and location to impart the desired directional characteristics to the air flowing from the interior to the exterior of the parachute during descent thereof.

It will be apparent from the foregoing description, that the vent opening in the parachute canopy may be much larger than would otherwise be permissable wherein the number and size of the air discharge openings provided between the two air flow controlling members may be varied as desired to attain various alternative effects in guiding and controlling the descent of the parachute. While several typical alternative embodiments of the present invention have been shown and described above, it will be apparent that the invention is capable of numerous modifications and changes so as to attain the advantages of the present invention in parachutes and parachute canopies of different and alternative sizes, shapes and contours. In view thereof it should be understood that the particular embodiments of the invention shown in the drawings and described above are intended to be illustrative only and are not intended to limit the scope of the invention.

I claim:

1. A parachute having a canopy with a substantially circular vent opening in the peak of the canopy, air flow controlling means for varying the flow of air through said vent opening and consisting of two generally semicircular flexible members extending inward in opposite directions from opposite sides of the vent opening, said members having the outer semicircular edges thereof secured to the canopy throughout substantially the entire circumferential edge of the vent opening and having adjacent inner free edges extending transversely across the mid-portion of the vent opening, the adjacent free edges of said members being relatively movable in response to change in the effective diameter of the vent opening during deployment of the canopy to control the passage of air through the vent opening.

2. A parachute as defined in claim 1 wherein the free edge of one of said members is longer than the free edge of another of said members.

3. A parachute as defined in claim 1 wherein said air passage faces in a predetermined direction and serves as an aid in guiding the parachute during descent.

4. A parachute as defined in claim 1 wherein the parachute canopy has one or more gores through which air may flow more readily than through other gores, and said one or more gores and said air passage cooperate to cause air issuing therethrough to impart thrust to the parachute in a predetermined direction during descent.

5. A parachute as defined in claim 1 wherein the free edges of said members are releasably connected together prior to deployment of said canopy.

6. A parachute as defined in claim 1 wherein said canopy has a hem about the vent opening to which said members are secured and by which said members are moved to present a restricted air flow controlling passage upon expansion of the peak of the parachute canopy during deployment.

References Cited

UNITED STATES PATENTS

| | | | |
|---|---|---|---|
| 1,862,247 | 6/1932 | Tricau | 244—145 |
| 2,196,947 | 4/1940 | Swofford | 244—142 |
| 2,726,057 | 12/1955 | Knacke | 244—145 |
| 3,298,639 | 1/1967 | Heinrich. | |

FOREIGN PATENTS 1,165,812  7/1958  France.

MILTON BUCHLER, Primary Examiner

J. E. PITTENGER, Assistant Examiner